United States Patent [19]

Faris

[11] 4,206,719
[45] Jun. 10, 1980

[54] AQUARIUM HOOD APPARATUS

[75] Inventor: Edwin E. Faris, Wyckhoff, N.J.

[73] Assignee: Metaframe Corporation, Elmwood Park, N.J.

[21] Appl. No.: 896,683

[22] Filed: Apr. 17, 1978

[51] Int. Cl.² ............................................. A01K 63/00
[52] U.S. Cl. ......................................... 119/5; 210/169
[58] Field of Search ........................ 119/3, 5; 210/169

[56] References Cited

U.S. PATENT DOCUMENTS

| | | | |
|---|---|---|---|
| 597,249 | 1/1898 | Smith | 119/5 |
| 1,769,388 | 7/1930 | Prentice | 210/185 |
| 2,652,151 | 9/1953 | Legus | 210/124 |
| 2,696,800 | 12/1954 | Rork | 119/5 |
| 2,742,381 | 4/1956 | Weiss et al. | 134/25 R |
| 2,858,799 | 11/1958 | Krauss et al. | 119/5 |
| 2,935,199 | 5/1960 | Willinger | 210/169 |
| 2,981,228 | 4/1961 | Brandano | 119/5 X |
| 3,324,829 | 6/1967 | De Jose et al. | 119/5 |
| 3,468,288 | 9/1969 | Cassil | 119/5 |
| 3,487,440 | 12/1969 | Newsteder | 210/169 |
| 3,513,978 | 5/1970 | Newsteder | 119/5 X |
| 3,516,544 | 6/1970 | Sesholtz | 210/169 |
| 3,525,435 | 8/1970 | Conner, Jr. | 210/169 |
| 3,540,593 | 11/1970 | Stewart | 210/169 |
| 3,566,840 | 3/1971 | Willinger | 119/5 |
| 3,578,169 | 5/1971 | White | 210/169 |
| 3,638,795 | 2/1972 | Feddern et al. | 210/169 |
| 3,731,090 | 5/1973 | Veloz | 119/5 X |
| 3,738,494 | 6/1973 | Willinger et al. | 210/169 |
| 3,892,199 | 7/1975 | Huyler | 119/5 |
| 3,983,843 | 10/1976 | Johnson | 119/5 |

FOREIGN PATENT DOCUMENTS

| | | | |
|---|---|---|---|
| 1302572 | 7/1962 | France | 119/5 |
| 25000 | 3/1963 | German Democratic Rep. | 210/169 |

OTHER PUBLICATIONS

Oscar Enterprises, Inc., advertisement for "Hydro-Pure" Aquarium Power Filter.

*Primary Examiner*—Louis G. Mancene
*Assistant Examiner*—Robert P. Swiatek
*Attorney, Agent, or Firm*—Hubbell, Cohen, Stiefel & Gross

[57] ABSTRACT

Aquarium hood apparatus having a base member with an aquarium filtration housing supported in partially depending relation to the base member, the housing having side walls, end walls, a bottom and an open top with a partition within the housing spaced from one end wall defining a water exit chamber for discharging water through an opening in the one end beneath the plane of the base member, the partition having the upper edge thereof spaced below the open end of the housing. A disposable filtration cartridge is disposed longitudinally between the partition and the other end wall to define a first fluid receiving chamber and a cleansed fluid chamber, the latter being in fluid communication with the first chamber, the height of the partition permitting overflow from the fluid receiving chamber into the first chamber in the event of clogging of the filter. A pump mounted to the surface of the base member draws fluid through a siphon tube through an inlet tube into the fluid receiving chamber, the housing being provided with a frictionally engaging cover plate to seal the open end thereof. The pump may be either directly coupled or magnetically coupled to the impeller thereof. A cover encloses the filtration apparatus, the cover also containing lighting means.

10 Claims, 7 Drawing Figures

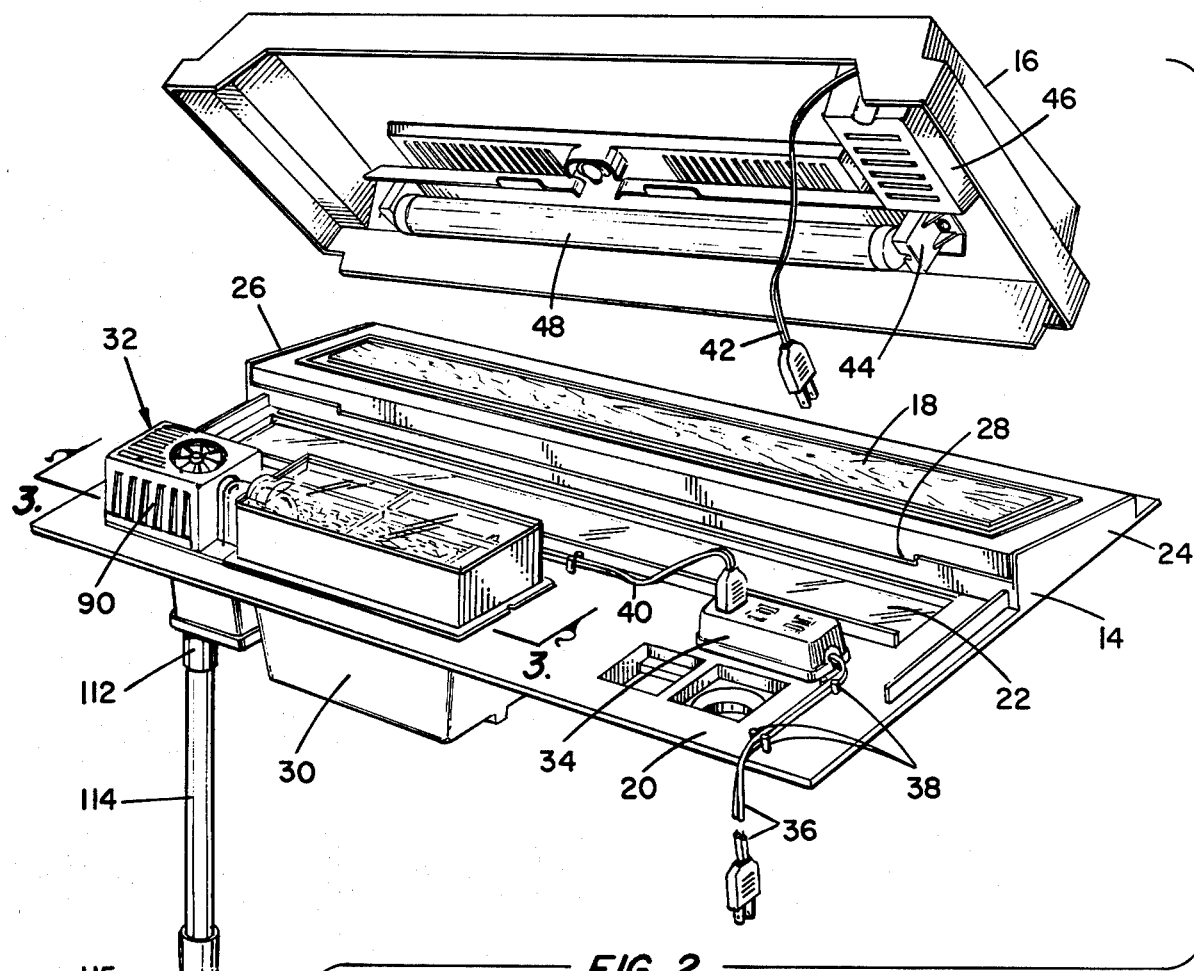
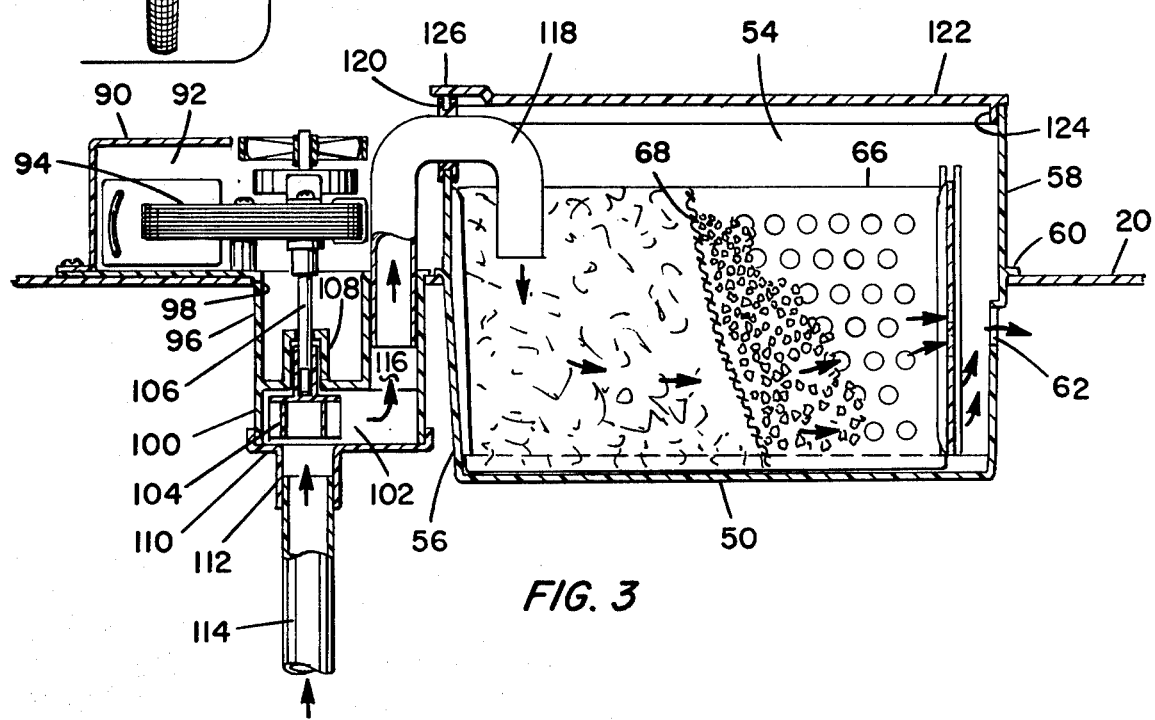

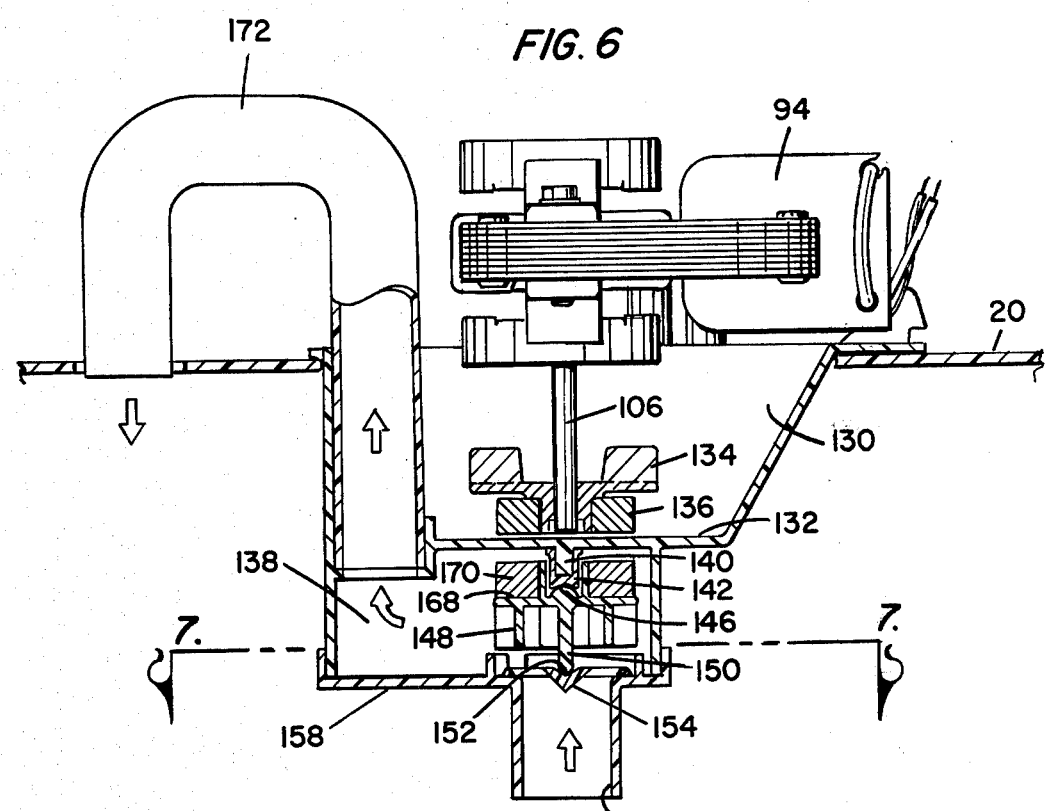
FIG. 6
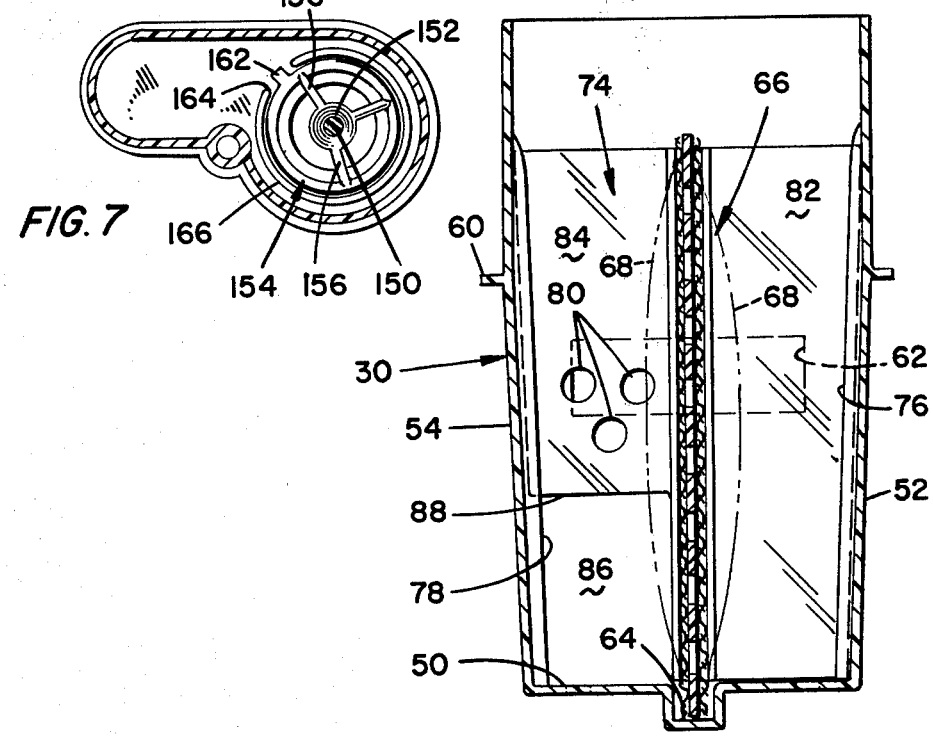
FIG. 7
FIG. 5

AQUARIUM HOOD APPARATUS

BACKGROUND OF THE INVENTION

The background of the invention will be discussed in two parts:

1. Field of the Invention

This invention relates to aquarium hoods and more particularly to an aquarium hood which incorporates aquarium filtration apparatus.

2. Description of the Prior Art

In conventional aquarium systems, the hobbyist generally utilizes an aquarium water filter to cleanse the debris laden fluid, such filters usually taking the form of a trough having a hook-shaped flange for suspending over the back wall of the aquarium. In addition, the aquarium may contain other air operated devices which require an air pump which is either positioned on a platform behind the aquarium, or suspended from a bracket on the back side of the aquarium, the intent of the hobbyist usually being to place unsightly apparatus on the rear wall to permit unobstructed viewing through at least three walls of the aquarium. An aquarium hood is also usually employed to cover the open top of the aquarium, the hood generally containing illuminating means such as a flourescent lamp which is electrically operated. With the electrically operated lamp, the electrically operated pump of the filter, and the electrically operated air pump, unsightly electrical cords and cord connectors are viewable through the aquarium unless artfully concealed.

Aquarium hoods have been devised to contain the various apparatus to eliminate the unsightliness of hanging equipment and the unsightliness of dangling electrical cords, one such device being shown and described in U.S. Pat. No. 3,638,795 in which a single hood unit contains various devices for illuminating, oxygenating, filtering, heating, irradiating and otherwise treating aquarium water. In this device, the water pump is placed beneath the level of the water within the aquarium to remove water therefrom for passage through a treatment device contained wholly within the hood enclosure.

Another such device is shown in U.S. Pat. No. 3,892,199 wherein the water treatment compartment is contained wholly within the enclosure of the hood.

Such devices and other similar devices, in the event of water leakage, create electrical shock hazards due to the provision within the enclosure of electrically operated apparatus such as pumps, lamps, or the like.

Accordingly, it is an object of this invention to provide a new and improved aquarium hood having an enclosure for containing apparatus therein with cleansed water discharge means below the plane of the hood.

It is another object of this invention to provide a new and improved aquarium hood containing filtration apparatus.

It is a further object of this invention to provide an aquarium hood having a filtration housing with means for sealing in the moisture within the filtration housing.

SUMMARY OF THE INVENTION

The foregoing and other objects of the invention are accomplished by providing an aquarium hood configured for substantially enclosing the open top of an aquarium, the hood including a base member coacting with a separable cover to define an apparatus enclosure, the apparatus including a filtration housing of generally trough-shaped configuration, the housing being secured to the base member with a portion of the housing depending below the base member. One end wall of the housing contains a fluid discharge opening below the base member. A cover encloses the open end of the filter housing to seal in the moisture. A partition is affixed to opposite sidewalls in spaced relation to the end wall containing the discharge opening to define a discharge chamber, the upper edge of the partition being spaced from the plane of the filter housing opening. Disposed between the partition and the opposite end wall is a filtration cartridge for forming a fluid receiving chamber and a cleansed fluid chamber, the cleansed fluid chamber being in fluid communication with the discharge chamber by means of apertures within the partition. Pump means are secured to the surface of the base member adjacent the filter housing for withdrawing fluid through an intake tube, thence through a tube passing through an end wall of the filtration housing into the fluid receiving chamber, the tube being sealed at the junction with the end wall. The enclosure contains electrical outlet means for electrical connection of the pump means and other electrical apparatus within the enclosure. The enclosure is configured for receiving other aquarium apparatus. The pump means contain an impeller which may be directly driven or magnetically coupled for driving by the motor.

Other objects, features and advantages of the invention will become apparent from a reading of the specifications when taken in conjunction with the drawings in which like reference numerals refer to like elements.

BRIEF DESCRIPTION OF THE DRAWINGS

FIG. 2 is a perspective view of the aquarium hood with the cover member in disassembled relation therewith;

FIG. 3 is a cross-sectional view of the aquarium filtration apparatus taken generally along line 3—3 of FIG. 2;

FIG. 5 is a sectional view of the filter housing taken generally along line 5—5 of FIG. 4;

FIG. 6 is an elevational view, partially in cross-section of an alternate form of filter pump for use with the apparatus of FIG. 1; and FIG. 7 is a cross-sectional view of the filter pump of FIG. 6 taken generally along line 7—7 thereof.

DESCRIPTION OF THE PREFERRED EMBODIMENT

Figure 1:
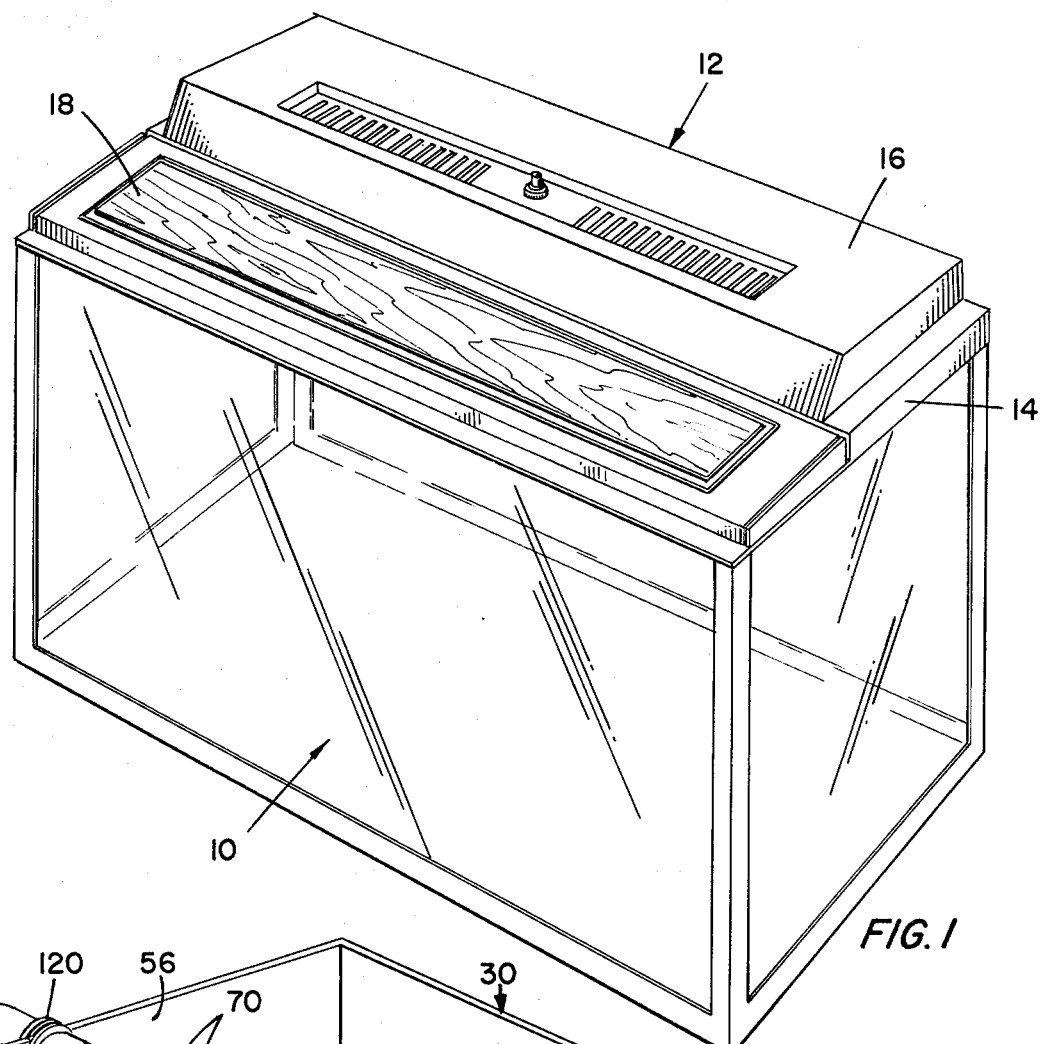
FIG. 1 is a perspective view of the aquarium having thereon an aquarium hood in accordance with the invention.

Referring now to the drawings and particularly to FIG. 1 there is shown an aquarium generally designated 10 of rectangular box-like construction with an open top covered by the hood apparatus generally designated 12 according to the invention. The aquarium 10, while being illustrated as having a metal framework may also conventionally be the type known as an all-glass aquarium. In either event the hood apparatus 12 includes a base member 14 configured for resting on the open top of the aquarium 10, a hood or rear cover 16 resting on the rear portion of the base member 14, and a front cover 18 pivotally coupled to the front portion of the base member 14 for providing access to the aquarium water for fish feeding and the like.

Referring also to FIG. 2, the rear portion 20 of the base member 14 is generally planar and generally rectangular in form with a longitudinally extending generally centrally located window section 22 of glass or the like, the window section 22 being located generally centrally relative to the width of the base member 14. The front portion of the base member 14 has upwardly extending end walls 24 and 26 with the front cover member 18 being located therebetween and hinged along its rear edge at 28 to the base member 14. The base member 14 is provided with a generally rectangular opening beneath the front cover 18 to provide access to the inside of the aquarium with the aquarium hood apparatus 12 positioned on the aquarium 10.

The hood or rear cover 16 is of an inverted generally trough-shaped configuration and when in position on the planar rear portion 20 of the base member 14 forms a housing for receiving and containing filtration apparatus therein such as a filter housing generally designated 30 and a suitable pump means generally designated 32 which are affixed to the rear portion 20. Also secured to the planar rear portion 20 is a suitable multiple plug socket 34 having the electrical cord 36 thereof maintained in position between pairs of aligned proximately spaced integral projections 38 which frictionally engage the cord 36. The socket 34 conveniently receives the plugs for the electrical cords 40 for the pump means 32 and 42 for the light source such as the flourescent lamp fixture 44 with its ballast 46, the fixture 44 and ballast 46 being secured on the undersurface of the hood 16. The fluorescent lamp 48 coupled to the fixture 44 is so positioned within the hood 16 for alignment with the window portion 22 with the hood 16 resting on the rear portion 20 of the base member 14.

Figure 4:
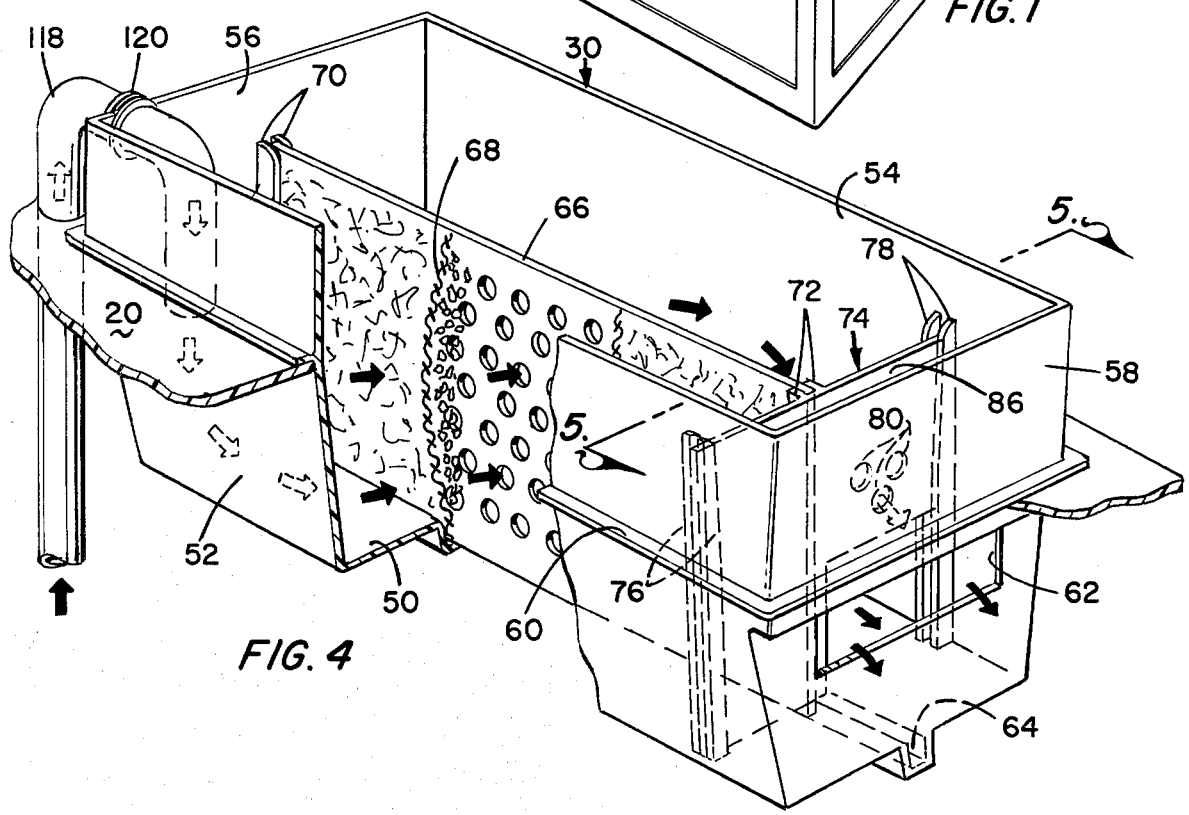
FIG. 4 is a perspective view of the filtration apparatus of FIG. 3 in phantom illustration and partially broken away.

Referring now to FIGS. 2, 3 and 4, the filtration apparatus includes a filter housing 30 which is a generally trough-shaped housing having a bottom 50, front and rear walls 52 and 54 respectively, and end walls 56 and 58. Extending generally intermediate the open top and the bottom 50 is a peripheral flange 60, the planar rear portion 20 of base member 14 having a rectangular cutout for receiving the housing 30 therein with the flange 60 abuttingly engaging the adjacent surface of the planar rear portion 20. The filter housing 30 is thus in partially depending relation to the planar rear portion 20 of the base member 14.

As best illustrated in FIGS. 3 and 4 the end wall 58 is provided with a rectangular opening 62 beneath the flange 60. The bottom 50 is provided with a longitudinally extending recess 64 disposed generally intermediate the front wall 52 and rear wall 54, the recess 64 being configured for receiving one edge of a filtration cartridge 66. The filtration cartridge 66 includes a generally rigid perforated board, rectangular in configuration, having bonded to the surfaces thereof layers of filtration media 68 such as alternate layers of porous and fine fibers. The filtration cartridge 66 is retained within filter housing 30 along one long edge within recess 64 with one end being retained between opposing spaced ribs 70 formed integrally on the interior of end wall 56 with a second pair of parallel spaced ribs 72 receiving the other edge, the ribs 72 being integrally formed in one surface of a partition member generally designated 74. The partition 74 is generally planar and positioned generally parallel to end wall 58 by means of opposite edges thereof being received within two pairs of parallel spaced ribs 76 and 78 respectively formed on the interior of front wall 52 and rear wall 54 respectively.

The interior of filter housing 30 is thus divided into a debris-laden fluid receiving chamber defined by front wall 52, the adjacent surface of filtration cartridge 66, the portion of the bottom 50 therebetween with the corresponding portions of the end wall 56 and partition 74. The opposite chamber is a cleansed fluid or clean water chamber defined by the opposite surface of filtration cartridge 66, the rear wall 54, the adjacent portion of the bottom 50 and the adjacent portions of the end wall 56 and partition 74 respectively. The spacing between the partition 74 and end wall 58 is a third chamber which is a water discharge chamber in fluid communication with the clean water chamber, this fluid communication resulting from a cutaway portion adjacent the bottom of partition 74 along with three apertures 80 formed in the partition 74 between the discharge chamber and the clean water chamber. The partition 74 is better illustrated in FIG. 5 wherein the plane of the partition 74 extends generally perpendicular to the plane of the filtration cartridge 66 with the area to the right of cartridge 66 being the debris-laden fluid receiving chamber 82, with the area to the left having the reference numeral 84 being the clean water chamber which is in fluid communication with the discharge chamber 86 by means of the cutaway portion 88 of the partition 74 adjacent the lower left hand corner as viewed in FIG. 5. As can be seen the cutaway portion 88 is only to the left of the filtration cartridge 66, and likewise the apertures 80 in the partition 74 immediately above the cutout portion 88 provide fluid communication between the clean water chamber 84 and the discharge chamber 86.

The upper edge of partition 74 is spaced from the top of the filter housing 30 with the upper edge of filtration cartridge 66 being generally coextensive therewith. As also illustrated in dotted lines in FIG. 5, the discharge opening 62 lies below the plane of the peripheral flange 60 of filter housing 30 to thereby provide for discharge of clean water at a level below the planar portion 20 of base member 14.

As illustrated in FIGS. 2 and 3, the pump means 32 includes a housing 90 which is secured to the upper surface of the planar rear portion 20, the housing 90 having an upper enclosure 92 for receiving an electrical motor 94 and a downwardly depending portion 96 extending through an opening 98 formed in the portion 20. The lower housing portion 96 terminates with a peripheral skirt portion 100 which defines a fluid passage chamber 102 configured for receiving an impeller 104 secured to the terminal end of the shaft 106 of the motor 94, the shaft 106 extending in a generally vertical direction and passing through an aperture formed in an interior partition 108 of the lower housing portion 96. The juncture of shaft 106 within the aperture is suitably sealed to prevent the passage of water therethrough. A bottom cover plate 110 engages the periphery of skirt 100, the plate 110 having a tubular sleeve portion 112 in axial alignment with the shaft 106, and consequently the axis of impeller 104. An intake tube 114 engages the opening of the sleeve portion 112 for drawing water from the aquarium through the tube 114 into the chamber 102 to pass through a tubular opening 116 formed integrally within the lower housing portion 96. A generally inverted J-shaped tube 118 engages the opening 116 to pass the water therethrough into the debris-laden fluid chamber 82 of the filter housing 30. As can be seen in FIGS. 3 and 4 the tube 118 has the horizontal portion thereof encircled by a sealing gasket member 120 which fits within a semi-circular cutout formed in end wall 56 of the filter housing. The filter housing 30 is provided with a lid 122 which has a peripherally depending flange portion 124 for engaging the inner surface of filter housing 30 adjacent the top thereof. In proximity to the grommet or sealing washer 120, the lid 122 is provided with an arcuately configured recess 126 to engage the grommet 120 in close abutting relation.

In an aquarium hocd apparatus wherein there are electrical components, care must be taken to safeguard the electrical components from moisture or water to the maximum extent possible. With the motor 94 contained above the plane of the planar rear portion 20 of the base 14, and the multiple plug socket 34 likewise secured to the upper surface of the planar rear portion 20 with the hood or cover 16 in place, all electrical components including the ballast 46 and fluorescent lamp 48 are contained within the enclosure defined by the planar rear portion 20 and the interior of the hood 16. To minimize the amount of moisture within this enclosure, the window section 22 is suitably frictionally engaged within the opening of the rear portion 20, and the open top of the filter housing 30 is enclosed by the frictional engagement of the flange 124 with the surface of filter housing 30 adjacent the open top thereof. For entry of water from the aquarium 10, the impeller 104 is spaced below the plane of the rear portion 20 of base member 14 and the discharge end of filter housing through the discharge opening 62 is likewise located below this plane. In operation, water is drawn from within the aquarium 10 through the strainer portion 115 through intake tube 114 past the impeller 104 through the chamber 102 through the opening 116 and thence through the tube 118 to pass into the dirty water chamber 82 of the filter housing 30. The water then passes through the filtration cartridge 66 to the clean water chamber 84, from whence it passes through either apertures 80 or through the opening defined by the cutaway section 88 of partition 74 into the discharge chamber 86 whereupon it passes out through the discharge opening 62 to be returned to the aquarium under the force of gravity. Should the filtration cartridge 66 become clogged, the water level within chamber 82 will rise until the water passes over the upper edge of partition 74 into the discharge chamber 86 to thereby pass out through the discharge opening 62. Since the upper edge of partition 74 is spaced from the top opening of filter housing 30, water from the filter housing does not enter into the enclosure between the cover 16 and the planar rear portion 20 of base 14 thereby protecting the electrical components of the aquarium hood apparatus.

A modified form of pump means 32 is illustrated in FIGS. 6 and 7 to further minimize the effects of moisture on the electrical components. The housing beneath the motor 94 is configured to form an enclosed compartment 130 having a lower generally horizontal plate-like portion 132. The motor shaft 106 terminates in proximate relation to the plate portion 132 and has affixed to the free end thereof a bladed cooling fan member 134 and an annular ring magnet 136 in spaced proximate relation to plate portion 132. The opposite side of plate portion 132 defines one wall of a water passage chamber 138 and depending from the undersurface of plate portion 132 in axial alignment with the shaft 106 of motor 94 is a bearing projection 140 encircled by a cup-shaped bearing member 142 formed from a self-lubricating plastic material. The exterior surface of bearing member 142 is concave for engaging a spherically shaped portion 146 of an impeller member 148, the shaft or axis 150 of impeller member 148 resting in a concave portion 152 of a generally circular bearing member 154. The bearing member 154 as can be seen in plan view in FIG. 7 has a peripheral rim with a plurality of radially inwardly extending arms 156 supporting the bearing portion 152 with openings between the arms thereof for passage of fluid therethrough. The water passage chamber 138 is enclosed by a cover plate 158 which has an inlet sleeve 160 in axial alignment with the shaft 106 of motor 94 and the shaft 150 of impeller 148. The inner surface of plate 158 is provided with a circular shoulder configured for receiving the bearing member 154 which is provided with a suitable tab 162 extending into a cutaway portion 164 of the shoulder 166 which is concentric with the sleeve 160.

The impeller member 148 has a generally disc-shaped portion 168 which has bonded thereto an annular ring magnet 170 in spaced proximate relation to the undersurface of plate portion 132 of compartment 130. The ring magnets 136 and 170 are of generally the same diameter and in axial alignment for rotation about the same axis. With the motor operating, ring magnet 136 will be driven and through magnetic coupling will drive ring magnet 170 along with impeller 148 to thereby draw fluid through the sleeve 160 through the fluid passage chamber 138 for discharge through the inverted J-shaped tube member 172 into the aquarium. The lower end of tube 172 is preferably adhesively coupled to the housing to communicate with the fluid passage chamber 138 to provide an optimum water tight sealing arrangement for compartment 130 to prevent accumulation of moisture in proximity to the motor 94.

The aquarium filtration apparatus according to the invention can be utilized with either the direct drive impeller arrangement of the pump means 32 as illustrated in FIG. 3, or with a magnetically driven impeller arrangement illustrated in FIG. 6. While there has been shown and described a preferred embodiment, it is to be understood that various other adaptations and modifications may be made within the spirit and scope of the invention.

What is claimed is:

1. In an aquarium hood apparatus, the combination comprising:

a base member for enclosing the open end of an aquarium, said base member having a generally planar portion;

a generally trough-shaped filter housing supported within an opening in said planar portion, said housing having a portion thereof depending from said base member, said housing having a bottom, sidewalls, end walls and an open top;

a partition secured within said housing between said sidewalls adjacent one end wall, said partition having the upper edge thereof displaced from the plane of said open top;

an opening in said one end wall of said housing disposed beneath said base member;

means on the other end wall and the facing surface of said partition for receiving a filtration cartridge to divide the volume therebetween into a first aquarium water receiving chamber and a cleansed fluid chamber; and fluid passage means within said partition for placing said cleansed fluid chamber in fluid communication with the chamber between said one end and said partition for passage of cleansed fluid therethrough through said opening in said one end wall, said filtration cartridge having the upper edge thereof coextensive with the upper edge of said partition whereby to permit overflow from said fluid receiving chamber through said opening in the event of clogging of said filtration cartridge.

2. The combination according to claim 1 wherein said fluid passage means is a cutaway portion of said partition.

3. The combination according to claim 2 wherein said apparatus further includes pump means mounted to said planar portion and tube means for drawing water through said pump means into said aquarium water receiving chamber.

4. The combination according to claim 3 further including a lid member for frictionally engaging and closing the open top of said housing.

5. The combination according to claim 4 wherein said apparatus further includes a cover member engaging said planar portion, said cover member being configured for providing a compartment therein for covering said pump means and said filter housing.

6. The combination according to claim 1 wherein said planar portion is generally plate-like and said housing engages the opening in said planar portion in frictional relation to provide a generally water-tight connection.

7. The combination according to claim 6 wherein said apparatus further includes pump means including a motor and an impeller member within a pump housing, said pump housing being secured to said planar portion with said motor above said planar portion and said impeller below said planar portion, said housing being so configured and so constructed for providing a generally water-tight compartment below said planar portion.

8. The combination according to claim 7 further including cover means for engaging the upper surface of said planar portion for substantially enclosing said pump means and said filter housing.

9. The combination according to claim 8 wherein said impeller member is directly coupled for driving by said motor.

10. The combination according to claim 8 wherein said impeller member is magnetically coupled for driving by said motor.

* * * * *